No. 691,343. Patented Jan. 21, 1902.
A. ABENDROTH.
STEAM PUMP.
(Application filed Mar. 23, 1901.)

(No Model.) 2 Sheets—Sheet 1.

Witnesses:

Inventor
Arthur Abendroth
by
Atty

No. 691,343. Patented Jan. 21, 1902.
A. ABENDROTH.
STEAM PUMP.
(Application filed Mar. 23, 1901.)
(No Model.) 2 Sheets—Sheet 2.

Witnesses:

Inventor
Arthur Abendroth
by [signature]
Atty

UNITED STATES PATENT OFFICE.

ARTHUR ABENDROTH, OF BERLIN, GERMANY.

STEAM-PUMP.

SPECIFICATION forming part of Letters Patent No. 691,343, dated January 21, 1902.

Application filed March 23, 1901. Serial No. 52,552. (No model.)

*To all whom it may concern:*

Be it known that I, ARTHUR ABENDROTH, a subject of the Emperor of Germany, residing at Berlin, in the Empire of Germany, have invented certain new and useful Improvements in Steam-Pumps; and I do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

This invention relates to cataract-pumps, and has for its object novel means for operating and controlling the steam-cylinder of such pump, regulated from the cataract-cylinder proper, and other features of invention which will be particularly pointed out and claimed.

Figure 1:
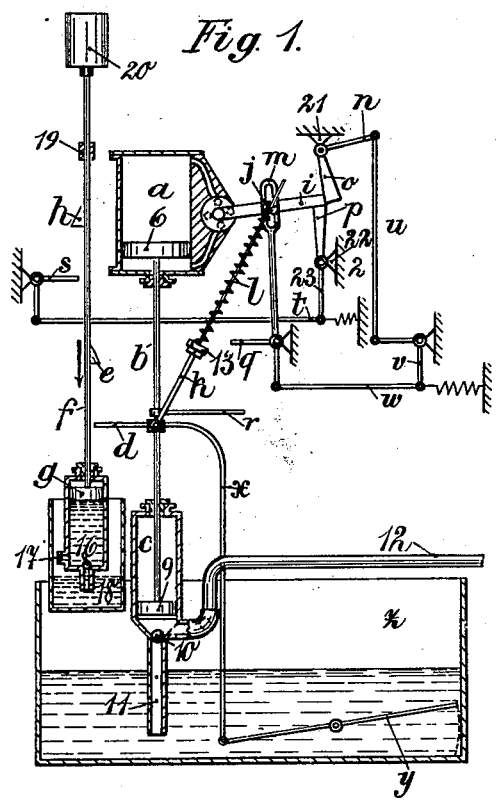
Figure 2:
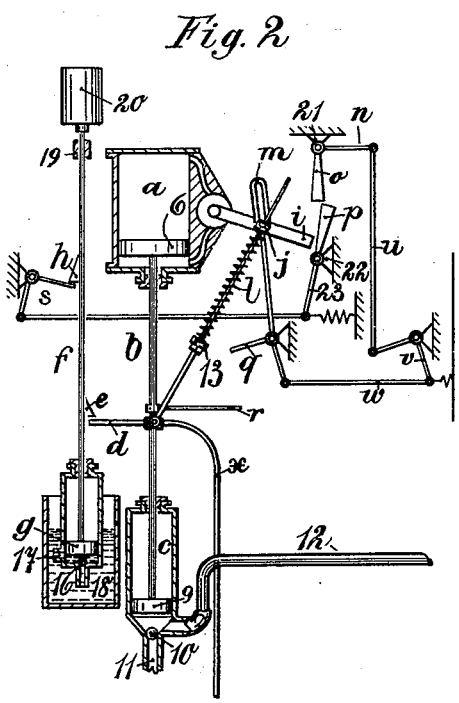
Figure 1A:
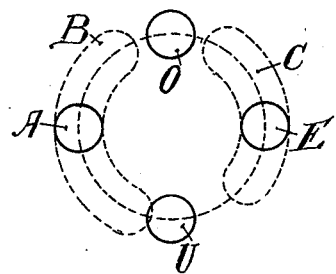
Figure 2A:
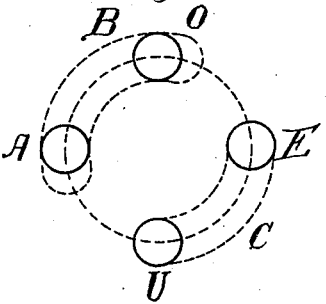
Figure 3:
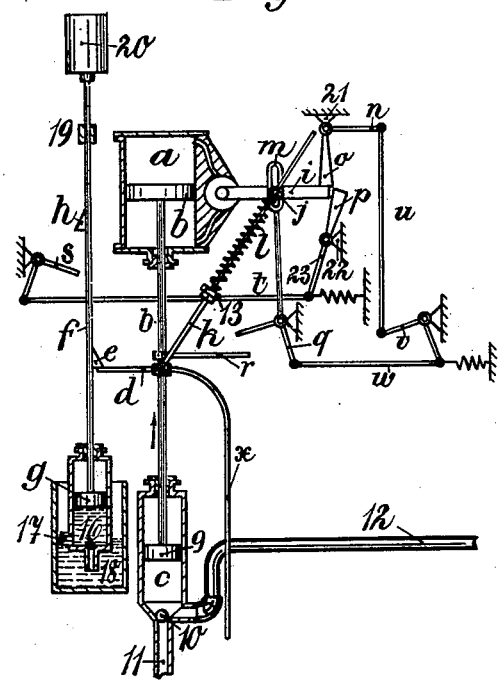
Figure 4:
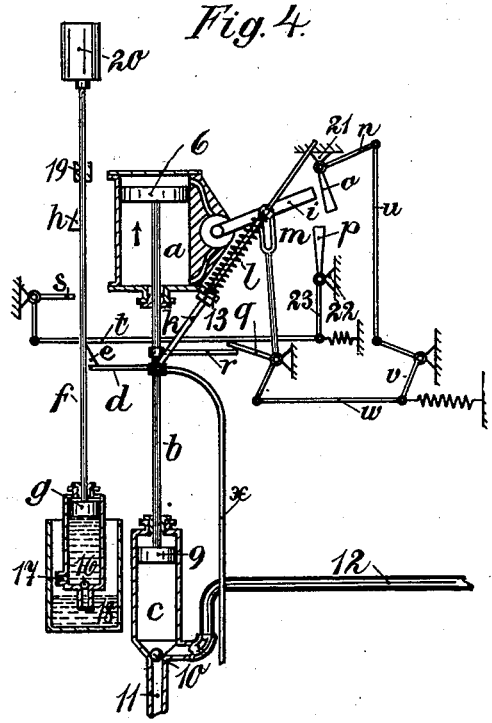
Figure 3A:
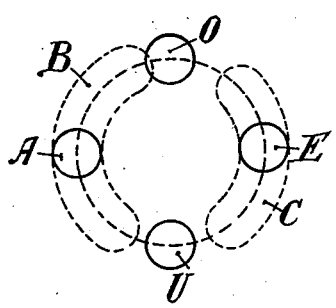
Figure 4A:
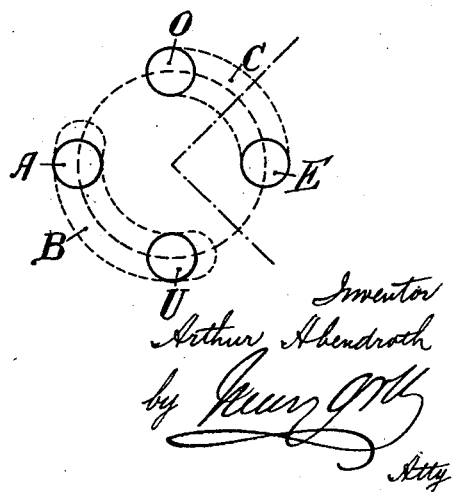

Referring to the drawings, in which like parts are similarly designated, Figure 1 is a view of my pump, showing the steam-piston at one end of its stroke; Fig. 2, a similar view showing the valve mechanism actuated by the cataract-pump to admit steam on the side of the steam-piston. Fig. 3 shows the steam-piston on the upward stroke lifting the cataract-pump plunger, and Fig. 4 the end of compression of the stroke of the steam-piston. Figs. $1^a$, $2^a$, $3^a$, and $4^a$ are diagrammatic views of the valve positions for several positions of the steam-piston in the above-mentioned diagrams.

Pumps such as herein shown can be advantageously used for the mixing and the periodic delivery of liquids, such as to mix milk of lime with ammonia-water for the purpose of recovering the ammonia, the two liquids being mixed in an intermediate chamber. Such pumps only make one or two strokes per minute, and a continuous motion of the pump will have the disadvantage of precipitating the suspended lime, and thereby clogging the valves in a very short time. For this reason hand-pumps have heretofore been used which made a certain number of strokes every quarter of an hour; but they had the disadvantage that the pumps were irregularly operated, so that the ammonia-water had either almost no or entirely too much milk of lime added to it.

The following invention has the advantage of making a quick stroke and regulated to remain inoperative between strokes.

The steam-cylinder $a$ is provided with a piston 6 and inlet-ports 7 7' at either end of the cylinder. Steam is admitted from the steam-chest located at the side of the cylinder and provided with the rotary valve 8. One inlet-passage, 7, is connected with a valve-port O and the other, 7', with a valve-port $u$, arranged diametrically opposite to the port O. Inlet-port E and exhaust-port A, arranged substantially at ninety degrees to the first-mentioned ports, as shown in Figs. $1^a$, $2^a$, $3^a$, and $4^a$, are controlled by a rotating valve proper in such a manner that the channel C, rotating on the axis, will enable either the port O or the port $u$ to be connected with the steam-inlet E or be cut off altogether, and at the same time either of the ports O or $u$ can be placed into communication with the exhaust-port A by means of the arcuate passage B.

As shown in Fig. $1^a$, exhaust from the lower side of the piston is nearly closed and steam is cut off altogether from the cylinder. Connected with this rotating valve is a lever-arm $i$, designed to suitably move the same.

The piston 6 is directly connected by means of the piston-rod $b$ to the suction-pump plunger 9. The suction-pump $c$, in which the plunger 9 reciprocates, has at its bottom a ball-valve 10, that controls the suction-pipe 11, that dips into the liquid to be pumped, said liquid being contained in a suitable vessel $z$. In the vessel $z$ is pivoted a stirrer $y$, adapted to keep the liquid agitated, said stirrer being connected by rod $x$, of any suitable shape, to the piston-rod $b$. The delivery-pipe 12 from the pump $c$ is designed to convey the liquid to any desired point.

Pivotally connected to the piston-rod $b$ is a rod $k$, the upper end of which works loosely through a swiveled pin $j$, fastened on the lever $i$. The rod $k$ supports a spring $l$, which is fastened with its lower end to a cross-head 13 of the rod $k$ and with its upper end to the swiveled pin $j$ of the lever $i$. In the middle position of the piston 6 and the lever $i$ the spring $l$ has no tension; but it is tightened by pressure or draft, according to the movement of the piston in one or the other direction. The swiveled pin $j$ is guided by a slotted link $m$, pivotally connected in the shown arrangement to the axis of the bell-crank lever $q$; but it may be fastened also on another part of the frame. The slot of this link serves as a stop in the end positions of the lever $i$. The piston-rod $b$ also carries two tappets $r$ and $d$, the latter adapted to engage the tappet $e$ on a cataract-pump piston-rod $f$. This pump is situated near the steam-operated pump and comprises a cylinder 15, in which operates the plunger $g$, and at the lower end of said cylinder is a bell-valve 16, controlling a stub suction-pipe. At the side of this cylinder or at any other convenient point at the lower end is the controlling outlet-port 17, the size of which determines the time of descent of the cataract-pump plunger. The cataract-pump cylinder is located in a suitable chamber 18, containing the liquid.

The piston-rod $f$ is suitably guided at 19 and weighted by suitable weights 20 at the top, whereby the rapidity of the drop of the plunger can be regulated. This plunger-rod $f$ also carries a second tappet $h$.

The valve-rod $i$ is controlled by a pair of tappets $o$ $p$, rotatably mounted in fixed bearings 21 22. The tappet $o$ is provided with an arm $n$, forming therewith virtually a bell-crank, is connected by rod $u$ to a bell-crank $v$, and this bell-crank is connected by rod $w$ to one $q$, the free arm of which is arranged to be acted upon by the tappet $r$, secured to the pump-rod $b$. However, this particular connection between the tappet $o$ and the tappet $r$ is not necessary, as any other suitable means, such as cord and pulley, may be used.

The tappet $p$ has a depending arm 23, connected by rod $t$ to the bell-crank $s$, the free arm of which is acted upon by the tappet $h$ on the cataract-plunger rod $f$. The other tappet $e$ on this rod is arranged to engage with $d$ on the steam-pump rod, and when the steam-pump rod is lifted the tappet $d$ takes under $e$ and also lifts the cataract-plunger.

The operation is as follows: The steam-pump is at the lower end of its stroke, Fig. 1, which has been quickly made. The steam-ports are in the position shown in Fig. 1ª, steam being cut off from both inlet-ports and exhaust nearly cut off below the steam-piston 6. The cataract-pump, however, descends more slowly by reason of the leakage of the contents of the cylinder 15 through the port 17 being restricted by the size of this port. Consequently during this movement the steam-pump remains idle. The spring $l$ has been tightened by draft, the lever $i$ being retained in its upper position by the tappet $p$. As soon as the tappet $e$ rests on $d$ the tappet $h$ having engaged the free arm of the bell-crank lever $s$ and moved it so as to throw the tappet $p$ from under the end of the valve-operating rod $i$, the spring $l$ will quickly draw this rod down and rotate the valve 8 to move its ports into the relative positions shown in Fig. 2ª, ready to exhaust from above the piston 6 and take steam below it. The steam-piston then makes its upward stroke, carrying with it the tappet $d$, lifting the cataract-pump, and actuating the stirrer $y$, at the same time lifting the tappet $r$; but before the stroke is completed the end of the valve-actuating rod $i$ engages the tappet $o$ and is stopped. During the remainder of the upward stroke of the piston spring $l$ is compressed, the rod $k$ having free movement through the pivot-joint $j$, the position of the ports being shown in Fig. 3ª. As soon as the upward stroke is about completed the tappet $r$ engages the free arm of the bell-crank $q$ to move the tappet $o$ and releases the valve-operating rod $i$. The spring $l$ being previously under compression, will now throw the rod $i$ upward, so as to admit steam to the upper side of the piston, the arrangements of the ports and steam-passages being shown in Fig. 4ª. The steam-piston is then forced down and the end of the valve-rod $i$ held by tappet $p$ until the cataract-pump by means of tappet $h$ actuates the bell-crank $s$.

Having thus described my invention, what I declare as new therein, and desire to secure by Letters Patent, is—

1. In a steam-pump, the combination with a steam-cylinder, provided with suitably-located steam-ports, its piston and piston-rod; of a force-pump, the plunger thereof directly connected to said piston-rod, a discoidal rotating valve controlling the aforesaid ports, resilient means connected to the piston-rod for moving said valve, and a cataract-pump operated to govern the time of throw of said valve, substantially as described.

2. In a steam-pump, the combination with a steam-cylinder provided with suitably-located steam-ports, its piston and piston-rod; of a force-pump, the plunger thereof directly connected to the steam piston-rod, a discoidal rotating valve, resilient means connecting the piston-rod and valve to operate the latter, a cataract-pump plunger lifted by said steam-pump and organized to control the time of throw of said valve during the descent of said cataract-pump plunger, substantially as described.

3. In a steam-pump, the combination with a steam-cylinder provided with suitably-located steam-ports, its piston and piston-rod; of a suction-pump, the plunger thereof directly connected to the piston-rod, tappets carried by said rod, a rotary valve, a valve-rod, a pair of tappets arranged to limit the motion of said valve-rod, a cataract-pump arranged to move one of said pair of tappets out of the path of said rod, and a tappet on the piston-rod arranged to move the other of said pair of tappets, substantially as described.

4. The combination with the power-cylinder of a steam-engine, its piston and piston-rod, a pump-plunger operated thereby, a discoidal rotating valve controlling the admission of steam to and its exhaust from said cylinder, and means for operating said valve; of a cataract-pump, its plunger, and mechanism operated by the movements of said plunger to hold the valve in its cut-off position for a predetermined time after each stroke of the piston, for the purpose set forth.

5. The combination with the power-cylinder of a steam-engine, its piston and piston-rod, a pump-plunger operated thereby, a discoidal rotating valve controlling the admission of steam to and its exhaust from said cylinder, and means for operating said valve; of a cataract-pump, its plunger, whose movement in one direction is controlled by the piston-rod, and mechanism operated by the movements of said plunger to hold the valve in its cut-off position for a predetermined time after each stroke of the piston, for the purpose set forth.

In testimony that I claim the foregoing as my invention I have signed my name in presence of two subscribing witnesses.

ARTHUR ABENDROTH.

Witnesses:
JOHANNES HEIN,
WOLDEMAR HAUPT.